(12) United States Patent
Cho (10) Patent No.: US 8,595,008 B2
(45) Date of Patent: Nov. 26, 2013

(54) OPERATION CONTROL APPARATUS AND METHOD IN MULTI-VOICE RECOGNITION SYSTEM

(75) Inventor: Chung Bum Cho, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 1108 days.

(21) Appl. No.: 12/559,281

(22) Filed: Sep. 14, 2009

(65) Prior Publication Data
US 2010/0286983 A1    Nov. 11, 2010

(30) Foreign Application Priority Data
May 7, 2009    (KR) .................. 10-2009-0039538

(51) Int. Cl.
*G10L 15/00* (2013.01)
(52) U.S. Cl.
USPC ............ 704/246; 704/231; 704/233; 704/275

(58) Field of Classification Search
USPC .................................. 704/246, 231, 233, 275
See application file for complete search history.

(56) References Cited

U.S. PATENT DOCUMENTS

| | | | | |
|---|---|---|---|---|
| 6,230,138 B1 * | 5/2001 | Everhart | ........................ | 704/275 |
| 6,240,347 B1 * | 5/2001 | Everhart et al. | ................. | 701/36 |
| 7,016,836 B1 * | 3/2006 | Yoda | ............................. | 704/233 |
| 7,203,651 B2 * | 4/2007 | Baruch et al. | ............... | 704/270.1 |
| 7,904,300 B2 * | 3/2011 | Abbott et al. | ................. | 704/275 |
| 2003/0144837 A1 * | 7/2003 | Basson et al. | ................. | 704/231 |

* cited by examiner

*Primary Examiner* — Vincent P Harper
(74) *Attorney, Agent, or Firm* — Birch, Stewart, Kolasch & Birch, LLP (57) ABSTRACT

An operation control apparatus and method of controlling a plurality of operationally connected voice recognition-enabled systems, each having reciprocal control operational states corresponding to an enabled/disabled state.

19 Claims, 9 Drawing Sheets

__OPERATION CONTROL APPARATUS AND METHOD IN MULTI-VOICE RECOGNITION SYSTEM__

CROSS-REFERENCE TO RELATED APPLICATIONS

The present application claims priority under 35 U.S.C. 119 and 35 U.S.C. 365 to Korean Patent Application No. 10-2009-0039538 filed on May 7, 2009, which is hereby incorporated by reference in its entirety.

BACKGROUND OF THE INVENTION

1. Field of the Invention

The present disclosure relates to an operation control apparatus and method for configuring and reciprocally operating a plurality of voice recognition-enabled systems co-residing in a single product.

2. Discussion of the Related Art

In a complex system including two or more systems, voice recognition is allowed only in a first system. When a second system requires an operation, the second system receives voice recognition results from the first system via a separate communication link and uses the received results.

Generally, only the first system (e.g., a master unit) includes a voice recognition module, at least one button or a touch unit that is a first user input unit for setting a voice recognition system (including the module) in order to recognize voice, and a microphone that is a second user input unit for inputting a user operation command to the voice recognition system. These elements are not included in the second system (e.g., a slave unit.)

Accordingly, when the second system intends to perform a specific operation through voice recognition, the voice recognition required by the second system is added to the first system and thereby developed, and the second system receives voice recognition results through a separate interface. Moreover, reciprocal control operations between the first and second systems are not performed.

SUMMARY OF THE INVENTION

Embodiments described below provide an operation control apparatus and a method in a multi-voice recognition system, that configure a plurality of voice recognition-enabled systems.

Embodiments described below also provide an operation control apparatus of a multi-voice recognition system, in which all of a plurality of systems include a voice recognition system, at least one button or a touch unit that corresponds to a first user input unit for setting the voice recognition system in order to recognize voice, and a microphone that corresponds to a second user input unit for inputting a user operation command to the voice recognition system.

In the plurality of systems according to the embodiments, first and second systems mainly operate in master (i.e., enable) and slave (i.e., disable) relationships, but they are not limited thereto. Each of the first and second systems may independently operate as a master. Alternatively, by switching their functions, each of the first and second systems may operate as a master or a slave.

In embodiments described below, voice recognition between the first and second systems may be controlled to be in an enabled/disabled state. This may be implemented through the communication control of a vehicle system, for example, a Control Area Network (CAN) interface.

In embodiments described below, voice recognition between the first and second systems may be controlled in an enabled/disabled state, based on the completion of a commanded function, e.g., in a case where an operation is not supported or via a separate user's control command.

In embodiments described below, different functions may be stored in a plurality of systems respectively, or common functions may be multiply stored in the plurality of systems according to user's setting.

In one embodiment, an operation control apparatus in a multi-voice recognition system includes: a plurality of voice recognition systems having a voice recognition module for recognizing voice; a first user input unit setting the voice recognition system to recognize voice, and setting a short key for realizing a preset specific functions; and a second user input unit inputting a user operation command to the voice recognition system.

In another embodiment, a reciprocal operation method in a plurality of voice recognition systems including a voice recognition module for recognizing voice includes: storing a plurality of functions to be performed in the voice recognition systems; enabling a first system according to input of preset information; receiving a function operation command through an input unit; checking whether an operation is supportable, when the function operation command is inputted; and performing at least one of realization of a commanded function, a re-input request of an operation command and an operation of informing a message which includes content in which an operation is not supported.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

First, the terms used herein are selected from terms that are as widely used as possible, but specific terms are arbitrarily selected by the applicant. Since operations and meanings about these specific terms will be described below in detail, the invention should be understood through the operations and meanings of the terms instead of the terms.

Figure 1:
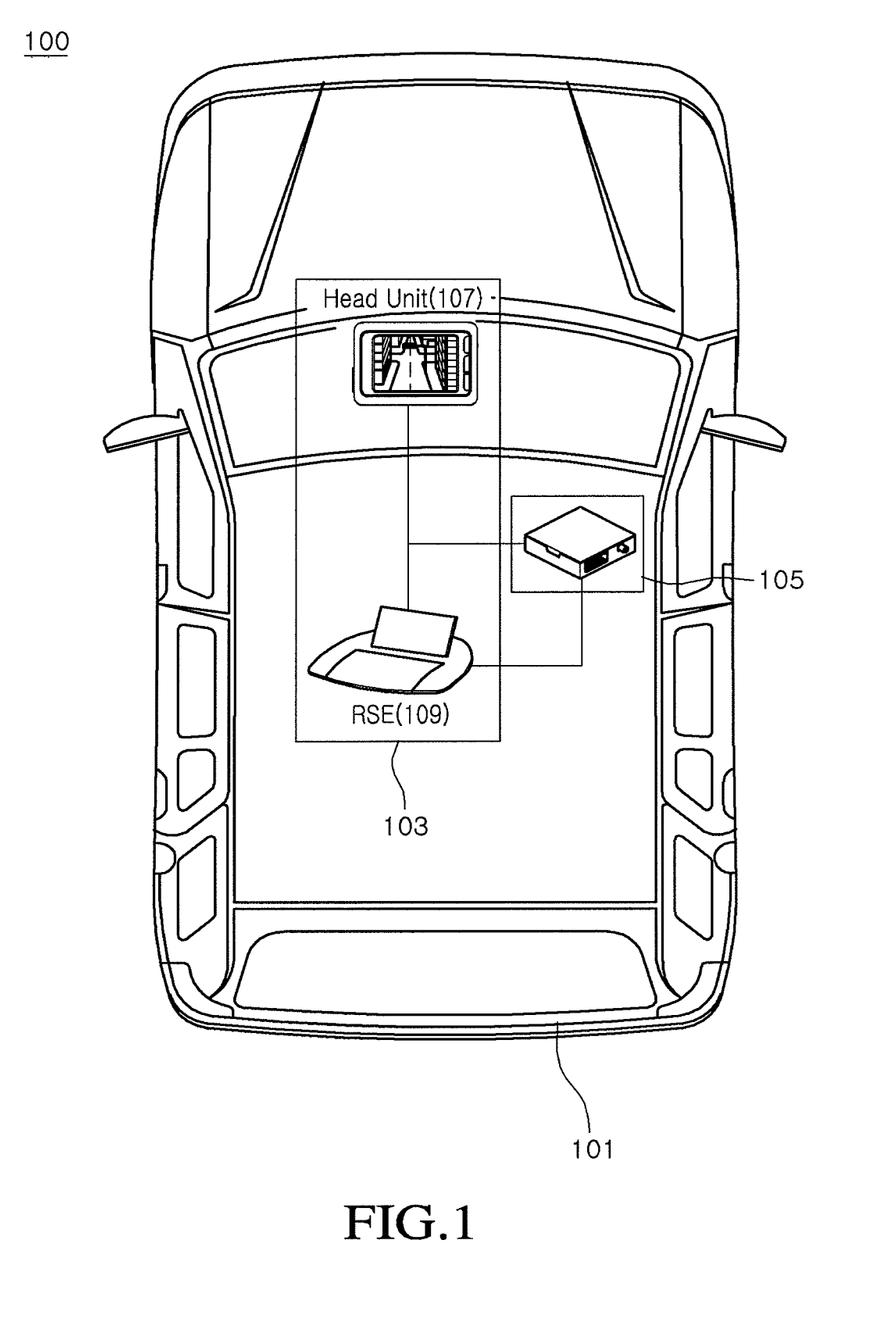
FIG. 1 is a diagram illustrating an example of a system which is included in a vehicle.

FIG. 1 is a diagram illustrating an example of a system which is included in a vehicle.

Referring to FIG. 1, a vehicle 100 includes a broadcasting module 105 and a plurality of systems 103 for recognizing voice commands.

The systems 103 may include a head unit 107 (corresponding to a first system), and a Rear Seat Entertainment (RSE) system 109 (corresponding to a second system.) The plural systems 103 may operate and reciprocally control each other (for example, enable/disable) according to a user input command. As an example, the user input command may involve voice recognition.

Operations between systems 107 and 109 may be performed through CAN communications.

The head unit 107 (e.g., the first system) or the RSE system 109 (e.g., the second system) may include the following functions/features: AM/FM radio function, satellite radio function, disk-related function, cassette tape function, MP3 function, Global Positioning System (GPS) or other navigation function, telephone/communication function, Bluetooth communication function and television (TV) function.

Figure 5:
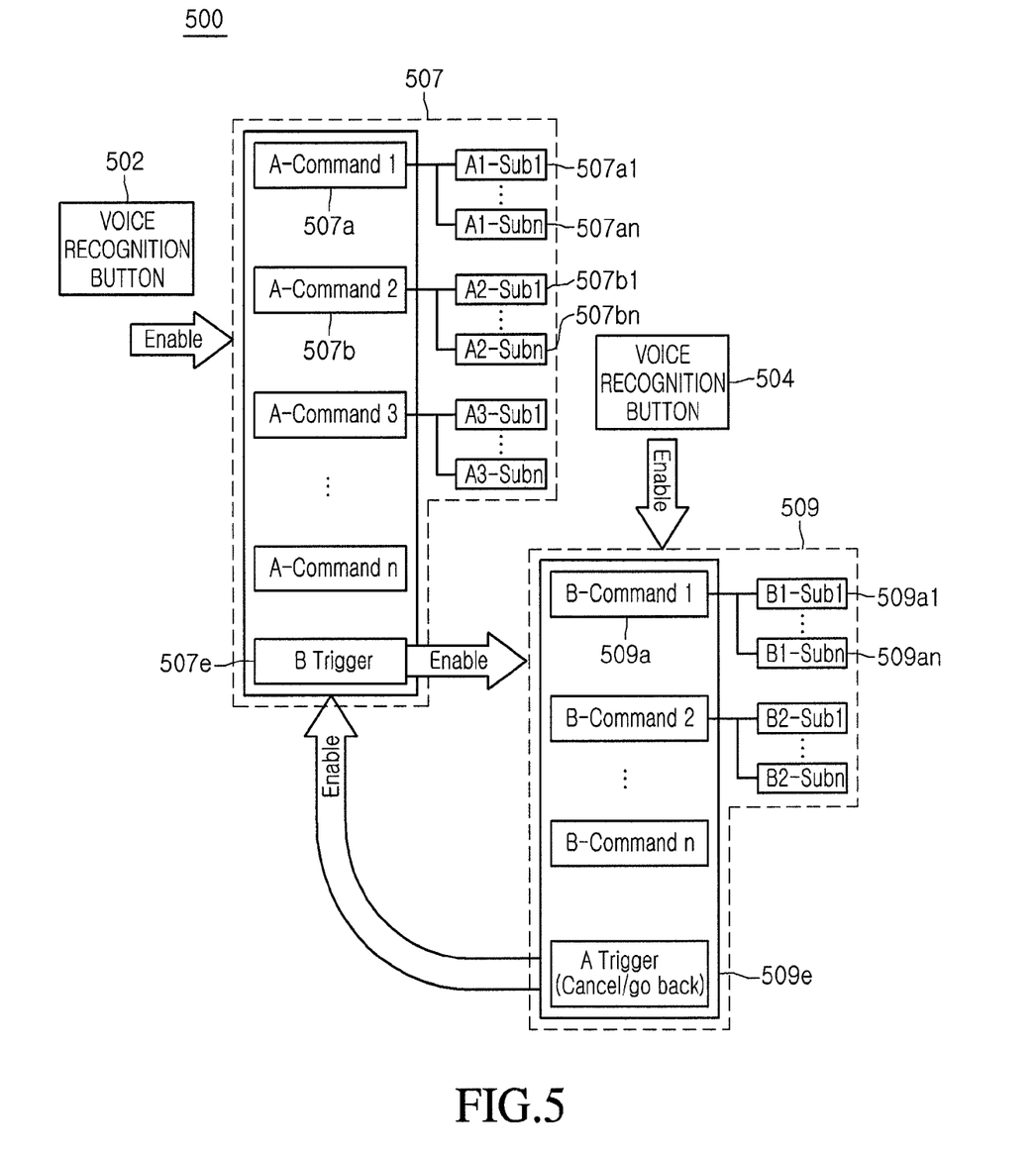
FIG. 5 is a diagram illustrating a scenario where a voice recognition system is enabled/disabled according to preset conditions such as a setting for voice recognition, performance of voice recognition functions and user commands.

The elements may be separately included in the first and second systems respectively, according to product features and options in use. The main function and sub function of each operation medium, as illustrated in FIG. 5, may be stored and implemented according to user's control.

The main function may include functions that are prestored in the system at a product-manufacturing stage. The sub function may include functions (for example, functions associated with a short key) that are separately stored by a user.

Moreover, the main function may be a function that is stored in the first system (e.g., a main system), based on various human factor estimations (for example, the frequency of use, the time of use and time of registration) that are preset.

In various embodiments, different functions may be stored in a plurality of systems respectively. Common functions may be multiply stored in the plurality of systems according to a user's setting.

It is possible to apply/install functions (e.g., functions that are desired or purchased by users) to vehicles without the limitation of the operation mediums/systems. In this case, a user command may be inputted to each system or to a reciprocal control-enabled system when necessary or appropriate. Functions that are desired by the users may be implemented based on various embodiments.

Figure 2:
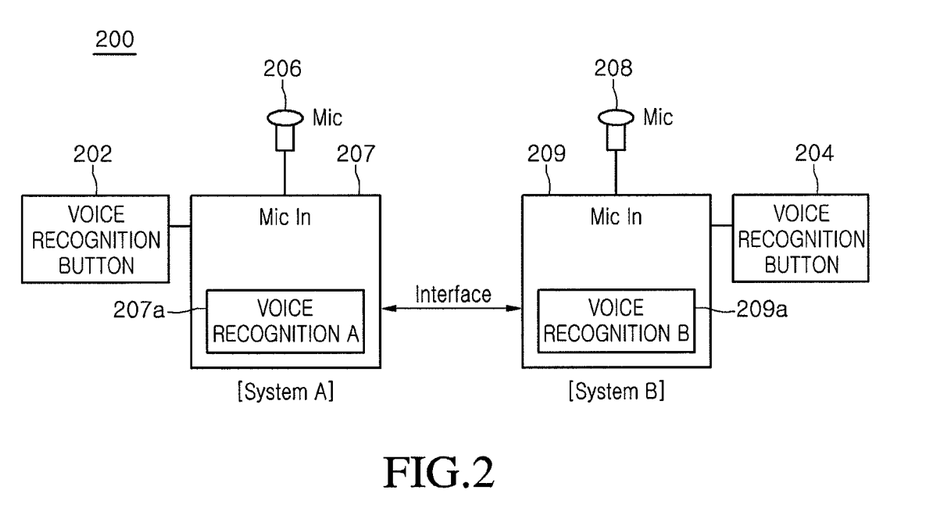
FIG. 2 is a diagram illustrating a voice recognition system, that switches voice recognition performance, voice recognition setting, voice recognition command and voice recognition, and relevant elements.

FIG. 2 is a diagram illustrating a voice recognition system of one embodiment includes a voice recognition system A 207 (e.g, corresponding to the head unit 107 shown in FIG. 1), and a voice recognition system B 209 (e.g., corresponding to the RSE system 109 shown in FIG. 1).

The voice recognition system A 207 includes a voice recognition module A 207a capable of recognizing voice. The voice recognition system B 209 includes a voice recognition module B 209a capable of recognizing voice.

The voice recognition systems 207 and 209 respectively interface with voice recognition buttons 202 and 204 (corresponding to a first user input unit for setting the voice recognition system in order to recognize voice), and microphones 206 and 208 (corresponding to a second user input unit for inputting a user operation command to a system in which voice recognition is set).

A user setting command that is inputted through the first user input unit may be inputted through another element (for example, a touch unit) in addition to or instead of the above-described button. That is, many user input units may be applied for enabling the voice recognition of a corresponding system.

In the above-described configuration, when information is inputted through the voice recognition button 202 of the voice recognition system A 207, the voice recognition system A 207 is in an enable state as a master and the voice recognition system B 209 is in a disable state as a slave.

The voice recognition system B 209 may be enabled by pushing the button 202 or may be enabled through the following method.

In one embodiment, a voice command capable of triggering the voice recognition module B 209a is added to the voice recognition module A 207a. When a control command for the change of the voice recognition system is sensed, the control authority for the microphone (i.e., the user voice input unit) is given to the voice recognition system B 209 through an interface. Accordingly, the voice recognition module A 207a of the voice recognition system A 207 is then set into a disabled state.

Voice recognition system A 207 is enabled when the voice recognition system B 209 receives the voice recognition use authority from the voice recognition system A 207. Subsequently, when a user completes a desired operation in the voice recognition system B 209 or when a voice command that indicates a return to a previous menu is sensed, the voice recognition system B 209 restores the control authority of the microphone to the voice recognition system A 207 through the interface and sets the voice recognition module B 209a into a disabled state.

The two systems set their voice recognition module to an enabled state to use the modules when they receive the control authority of the microphone.

The following description provides use examples of the voice recognition buttons.

A voice recognition button may be included in one or both of voice recognition system 207 and 209. The voice recognition button may be implemented as a short key (i.e., a hot key) for directly performing functions that are set by a user.

For example, when a user controls trigger through the voice recognition button 202, the voice recognition module A 207a enters into an enabled state. When the user controls trigger a device enablement through the voice recognition button 204, the voice recognition module B 209a enters into an enable state.

The voice recognition button 204 may be implemented as a short key for directly performing a specific function.

Additionally, the voice recognition module may be enabled by pushing the voice recognition button. Likewise, the voice recognition module may be disabled through the voice recognition button.

In some embodiments, reciprocal control operations may exist between three or more systems.

Figure 3:
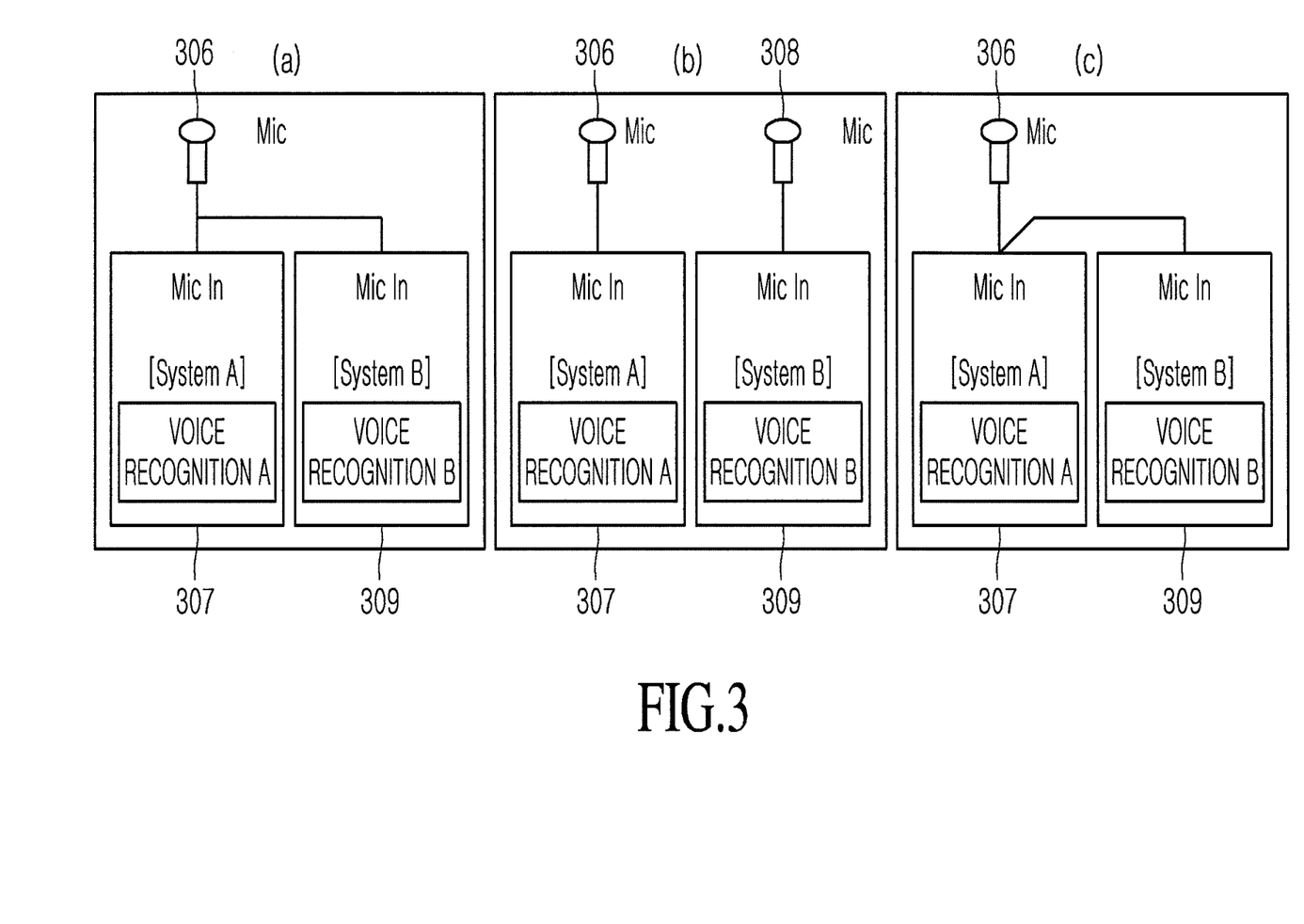
FIGS. 3(a) to 3(c) are diagrams illustrating respective voice recognition systems that include at least one microphone that is a second user input unit for inputting a user operation command to a voice recognition system and receive a user command that is inputted through the second user input unit.

FIGS. 3(a) to 3(c) are diagrams illustrating respective voice recognition systems that include at least one microphone (for example, microphones 306 and 308) that is a second user input unit for inputting a user operation command to a voice recognition system and that receives a user command.

In FIG. 3(a), the voice recognition system includes only one microphone 306, and a user setting command for voice recognition is recognized in the system when the voice recognition buttons 202 and 204 (shown in FIG. 2) are pushed.

That is, a voice recognition system including a pushed-button is set in an enable state in software, and a voice recognition system including a non-pushed button is disabled in software. Accordingly, a user command that is inputted through the microphone is realized in the enabled system. In FIG. 3(a), two systems share one microphone.

FIG. 3(b) illustrates an embodiment where the microphone 306 is independently configured and a user command is inputted.

FIG. 3(c) illustrates a switching process where a user commands a change to the control authority of microphone 306. Here, after the user completes a desired operation, a command for returning to a previous menu is inputted or a control authority for microphone 306 is given to system 309 because current system 307 cannot support a corresponding function.

Figure 4:
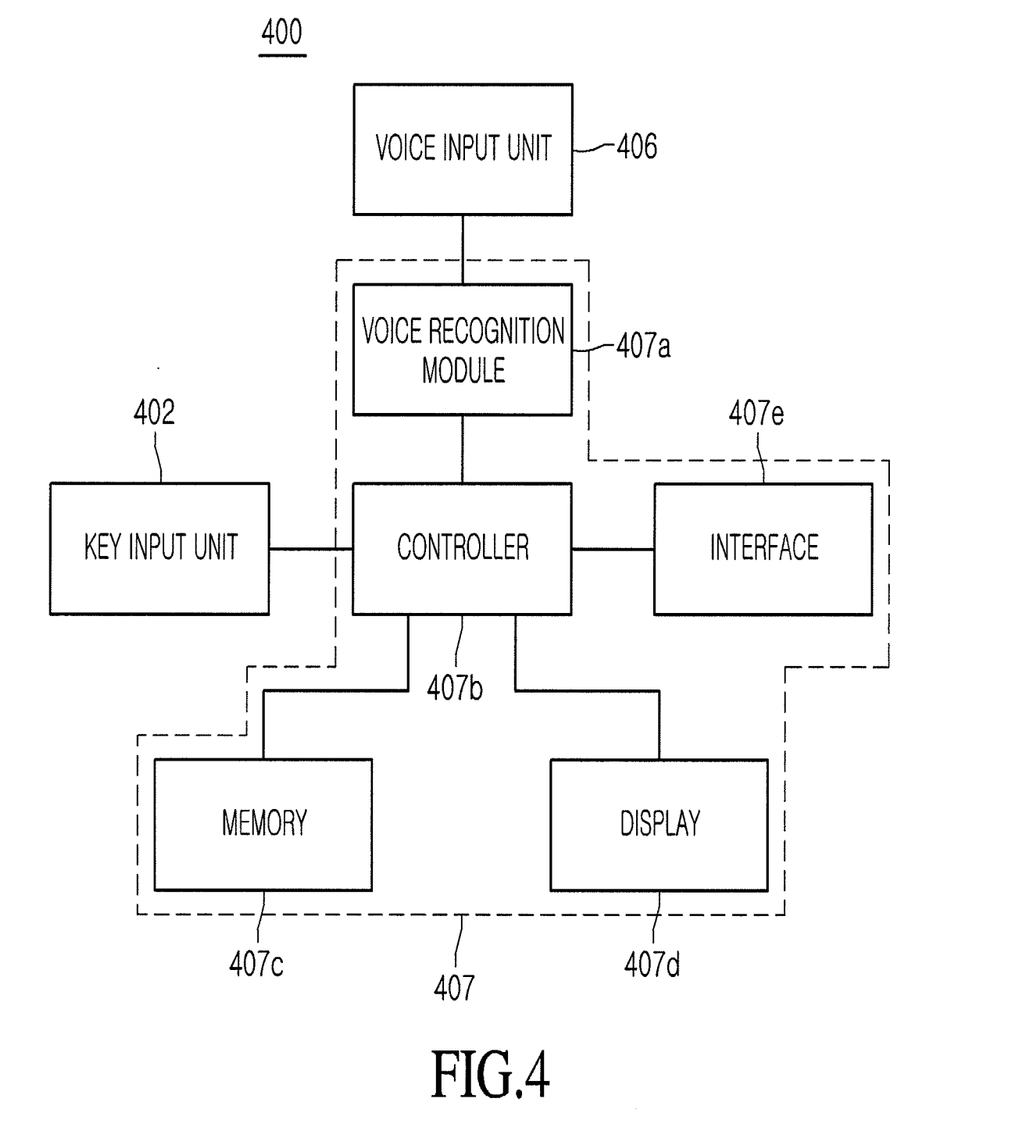
FIG. 4 is a block diagram illustrating in detail the configuration of each voice recognition system in FIG. 2.

FIG. 4 is a block diagram illustrating in detail the configuration of the voice recognition systems 207 and 209 in FIG. 2.

Referring to FIG. 4, each of the voice recognition systems 207 and 209 includes a first user input unit 402 (i.e., a key input unit), a second user input unit 406 (i.e., a voice input unit) and a voice recognition system 407. The first user input unit 402 sets the voice recognition system into an enabled state so as to recognize voice commands. The second user input unit 406 inputs a user operation command to the voice recognition system.

The voice recognition system 407 includes a voice recognition module 407a, a controller 407b, a memory 407c, a display 407d, and an interface 407e. The voice recognition module 407a recognizes a user command which is inputted through a microphone as a second user input unit 406. The controller 407b changes the operation state of an enabled system to a maintenance/disabled state and controls overall system operations, based on button information which is inputted through a button being the first user input unit 402, a user command (which is inputted through the second user input unit 406) that indicates that operation authority is given to another voice recognition system or whether a function desired by the user may be performed in an enabled system on the basis of the button information. The memory 407c stores main functions and sub functions that may be supported by each voice recognition system. The display 407d outputs the functions that are stored in the memory 407c. The interface 407e interfaces the enabled/disabled operation state setting control between the voice recognition systems.

The voice recognition system 407 is configured in plurality.

In a state where a first system (for example, the voice recognition system 407) among a plurality of voice recognition systems is enabled on the basis of input button information (e.g., information that is inputted through the first user input unit 402 (i.e., key input unit)), when a user command that indicates control authority is given to the second system (not shown, but may be the voice recognition system 209 in FIG. 2) is inputted, the first system is disabled and the second system is enabled.

Generally, operation functions that are stored in the first system of the plurality of voice recognition systems and operation functions which are stored in the second system are classified and separately stored. Classification items are classified and stored based on (1) whether the operations of the voice recognition system are realized by a short key, (2) whether a user command is directly realized in the voice recognition system and/or (3) whether a user operation command is realized over another network.

A function of directly realizing a user command in the voice recognition system is stored in the memory of the first system. This may be implemented to the contrary. For example, the function may be stored in the second system.

As an example, when a user operation command that is inputted through a microphone is "telephone ->home" (i.e., a voice command instructing the system to call a phone number designated as a home phone number), the corresponding actions are realized by controlling the voice recognition module of the first system when another network is not required (for example, when communication with a service center is not required because the user command can be realized in the system).

A function of being realized over another network is stored in the memory of the second system.

For example, when a user operation command which is inputted through a microphone is "navigation ->home", the corresponding actions are realized by controlling the voice recognition module of the second system because communication with the center is required.

Moreover, when performing an operation via the voice recognition system by a short key, a command is realized by controlling the voice recognition module of the second system.

For example, by pushing the key input unit 402, at least one key number and/or function that is preset and prestored by a user is displayed. The key number and the stored function are matched according to the setting of the user.

For example, functions for telephone may be stored in short key number 1, functions for navigation may be stored in short key number 2, and functions for a portable media player (PMP) may be stored in short key number 3.

A frequently-used telephone number may be stored in the short key number 1, and the system telephones this number according to a user command. For example, when the user inputs a user command corresponding to "number 1" or "1" after pushing a short key, the system directly telephones to a telephone number that is stored in the short key number 1.

In another embodiment, when a shot key is pushed, functions that are stored in each number are displayed, and a user command may be inputted through a microphone.

Information that is stored in each number may be variably changed based on preset factors (for example, the frequency of use, the point of time used, the point of time registered and the degree of importance) that are preset, i.e., stored numbers may be variably changed. In this way, in a case where stored numbers are variably changed, functions which are stored in each number are displayed when a short key is pushed, and a user command may be inputted through a microphone.

FIG. 5 is a diagram illustrating a voice recognition system that is enabled/disabled according to preset conditions.

As illustrated in FIGS. 2 and 4, when a voice recognition button is inputted, a first system 507 is in an enabled operation state.

Referring to FIG. 5, functions to be performed according to respective user's input commands are stored as functions (for example, A-Command 1 507a, A-Command 2 507b, ... ) and sub functions 507a1, 507an, 507b1 and 507bn of the main functions) in the memory of a first system. As an example, information for recognizing a telephone function is stored in the main function "A-Command 1" 507a, and information for recognizing a navigation function is stored in the main function "A-Command 2" 507b.

Sub functions are stored with respect to the corresponding main functions.

For example, information on "A1-Sub1 (telephoning)" 507a1 and "A1-Subn (number search)" 507an is stored as a sub menu of the telephone function "A-Command 1" 507a, and information on "A2-Sub1 (path input)" 507b1 and "A2-

Subn (optimal path search)" 507*bn* is stored as the sub menu of the navigation function "A-Command 2" 507*b*.

In a state where the system is enabled, when a user operation command (for example, "telephone ->search numbers") is inputted, the system searches telephone numbers that are stored in a telephone on the basis of the stored information and displays a search result.

The stored main functions and sub functions may be displayed when the system is enabled.

While an operation for voice recognition is being performed through the first system, the second system may be enabled based on a trigger operation 507*e* when a user command or a command for a non-supported function is inputted.

While an operation for voice recognition is being performed through the second system, the first system may be enabled based on a trigger operation 509*e* when a user command that indicates a return to a previous mode of operations or a return to an upper/lower hierarchal mode of operations and when an operation for a function that is indicated by a user are completed.

By storing functions in the second system 509 that are not stored in the first system or functions to be performed as a short key, each function to be performed in the second system 509 may be provided to the second system and thereby performed based on user settings or inputs.

As an example, information on "B1-Sub1 (English conversation)" 509*a*1 or/and "B1-Subn (movie play)" 509*an* may be stored as a sub menu of a main function "B-Command 1" 509*a* "PMP".

As another example, functions that operate as a short key may be stored and used as a main function and a sub function.

For example, a frequently-used telephone number may be stored as a short key number 1 in a main function "B-Command 1" 509*a*, and information on "B1-Sub1 (the telephone number-related telephone number)" 509*a*1 may be stored as a sub menu.

Functions that are stored in the first system or the functions of products may be classified as a main function, and functions that are stored in the second system or functions of products may be classified as a sub function.

Figure 6:
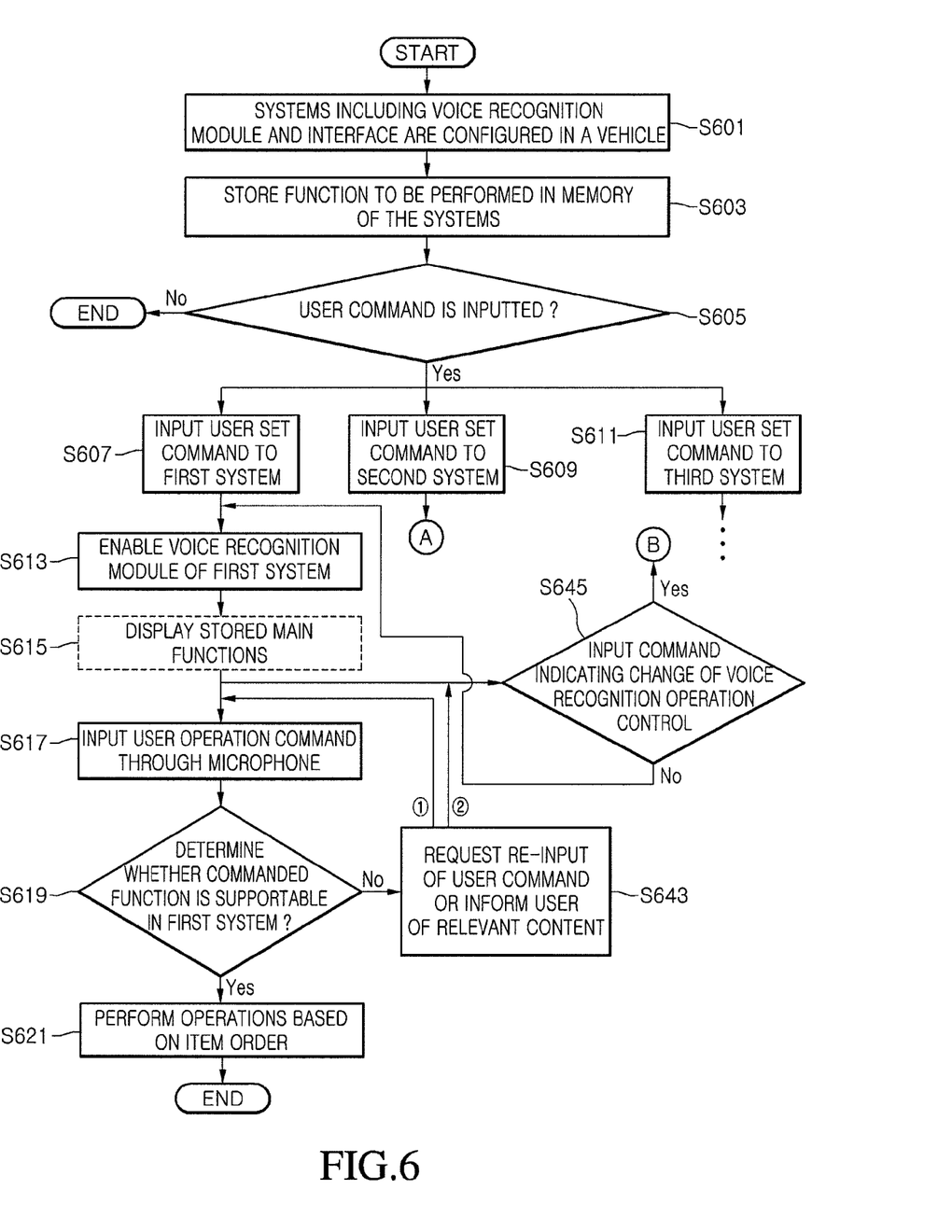
FIGS. 6 and 7 are flowcharts illustrating the reciprocal operation control of a multi-voice recognition system according to an embodiment.
Figure 7:
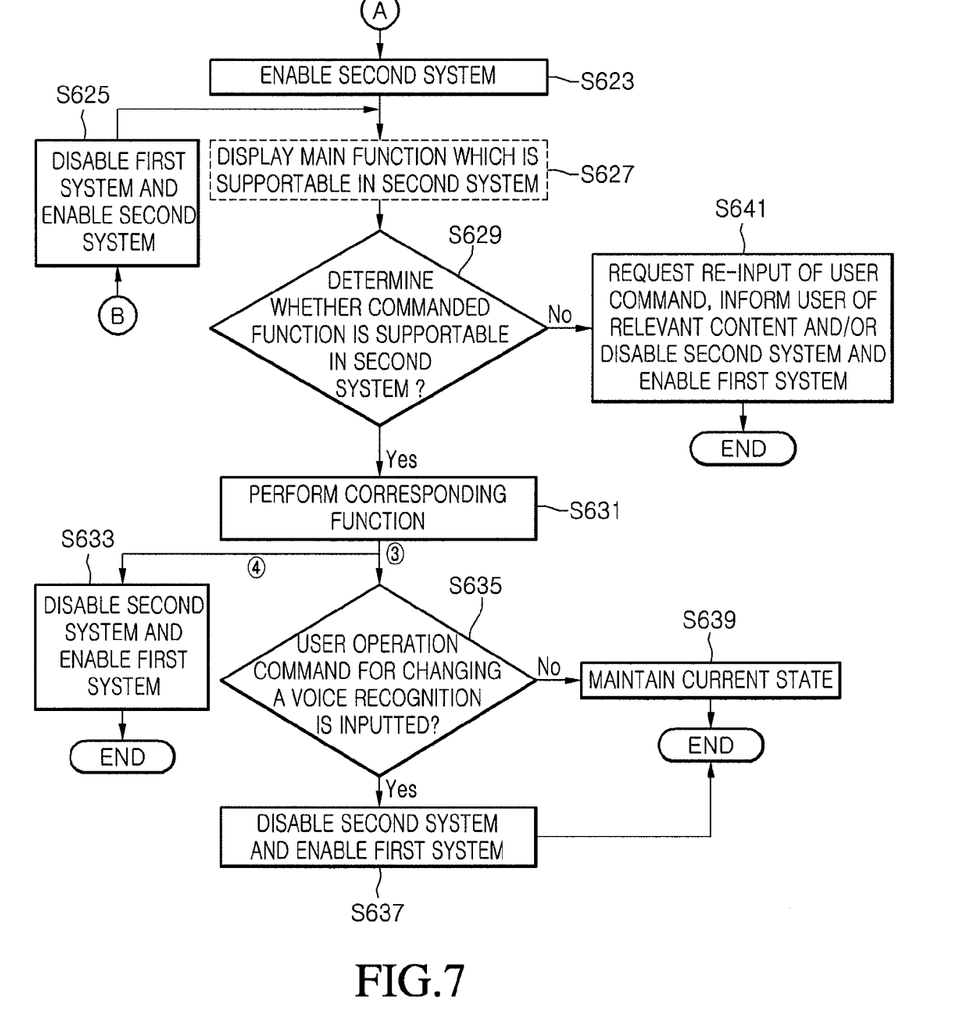

FIGS. 6 and 7 is flowcharts illustrating a reciprocal operation control of a multi-voice recognition system according to an embodiment.

As illustrated in FIG. 1, the systems 107 and 109 (shown in FIG. 1) are included in one product, for example, a vehicle. Each of the systems 107 and 109 includes the voice recognition module 407*a* (shown in FIG. 4) for voice recognition and the interface 407*e* for the reciprocal operation between the systems 107 and 109 in operation S601.

In one embodiment, the voice recognition system may not include the first user input unit 402 and the second user input unit 406 (shown in FIG. 4).

The first user input unit 402 sets the voice recognition system into an enabled state so as to recognize voice. The second user input unit 406 inputs a user operation command to the voice recognition system.

That is, in one embodiment, only a system to be used as master (for example, the system A) includes the button and the microphone, and thus, operations based on voice recognition operation setting (for example, enable/disable) that are performed through the button and a voice recognition command that is inputted through the microphone may be performed through the controller and the interface.

A function to be performed according to a voice command that is inputted to the each system may be stored in the memory in operation S603.

For example, stored functions may be classified and stored as a main function and a sub function. As described with reference to FIG. 5, the main function may include a telephone function, a navigation function and a PMP function. The sub functions of the main function may also be stored.

"Telephoning" and "telephone number search" may be stored as sub functions of the telephone function. Moreover, the sub functions (not shown) of other main functions (for example, the navigation function and the PMP function) may be stored to realize corresponding operations according to a user operation command which is inputted.

In the above-set state, the system determines whether a user command is inputted through the button (e.g., the first user input unit for setting the system in an enable state) so as to recognize voice commands in operation S605.

Like in FIG. 2, when the determination result shows that a user set command is inputted to the first system 207 through the button 202, the voice recognition module 207*a* of the first system 207 is enabled in operations S607 and S613.

Accordingly, the functions which are stored in the memory (shown in FIG. 4) are displayed as illustrated in FIG. 5 in operation S615.

Operation S615 is an option where displayed functions may be changed according to user's selection.

For example, stored functions may be set to be displayed. When the stored functions are displayed, only a main function may be displayed, or both the main function and sub functions may be displayed.

Moreover, the display order of the functions that are displayed may be variably displayed based on preset factors, for example, the frequency of use, the point of time used, the point of time registered and the degree of importance.

When the system is enabled or/and the stored functions are displayed, a user operation command is inputted through the microphone in operation S617.

The system determines whether the commanded function is supportable through the enabled first system in operation S619. When the commanded function is supportable through the enabled first system, operations are performed based on an item order (shown in FIG. 5) according to a user operation command that is inputted in operations S619 and S621.

When the first system does not support the function (for example, "telephone ->telephoning ->home") that is commanded by a user as a result of the determination in operation 5619 (herein, a case in which voice is not accurately recognized is also included), the system informs the user of relevant content or requests the re-input of the user command to the user in operation S643.

When the re-input of the user command is requested, the system again receives the user operation command and repeats operations of checking whether the commanded function is supportable.

When a command transferring voice recognition operation control authority to the second system is inputted, the first system is disabled and the second system is enabled according to the control of the controller in operation S625.

As described above, the operations of the enabled second system in operations S627, S629, S631 and S641 are the substantially same as operations S615, S617, S619, S621, S643 and S645 in the first system.

When a corresponding function that is commanded by the user is performed in operation S631, the second system is disabled, and the first system is enabled in operation S633. Alternatively, the operation states of the first and second systems may be maintained as-is.

When a corresponding function that is commanded by the user is completed or performed in operation S631, the system determines whether a user operation command (for example, a command that indicates returning to a previous menu or system) is inputted in operation S635. When the determination result shows that the user operation command is inputted, the second system is disabled, and the first system is enabled in operation S637. When the determination result shows that the user operation command is not inputted, a current operation state is maintained in operation S639.

Figure 8:
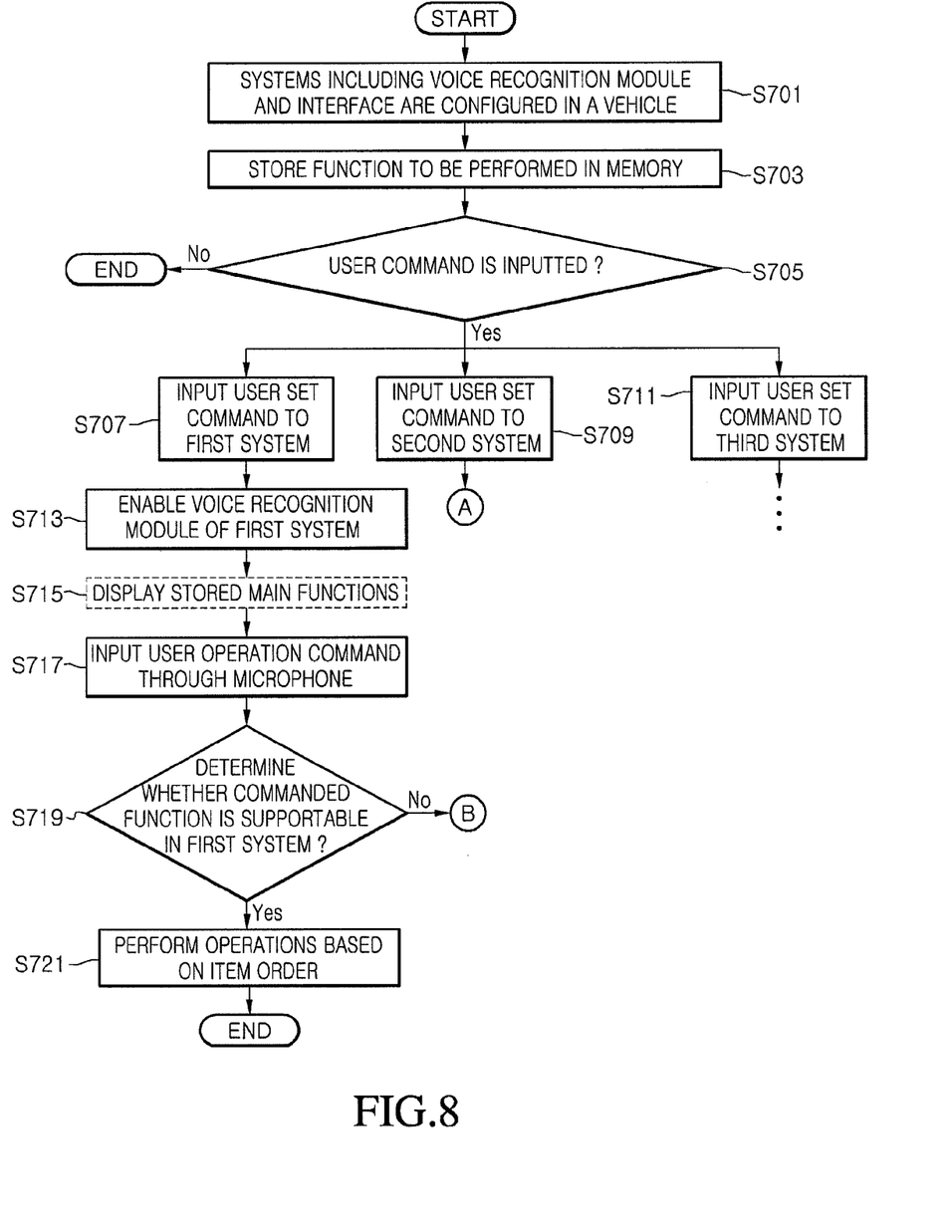
FIGS. 8 and 9 are flowcharts illustrating the reciprocal operation control of a multi-voice recognition system according to another embodiment.
Figure 9:
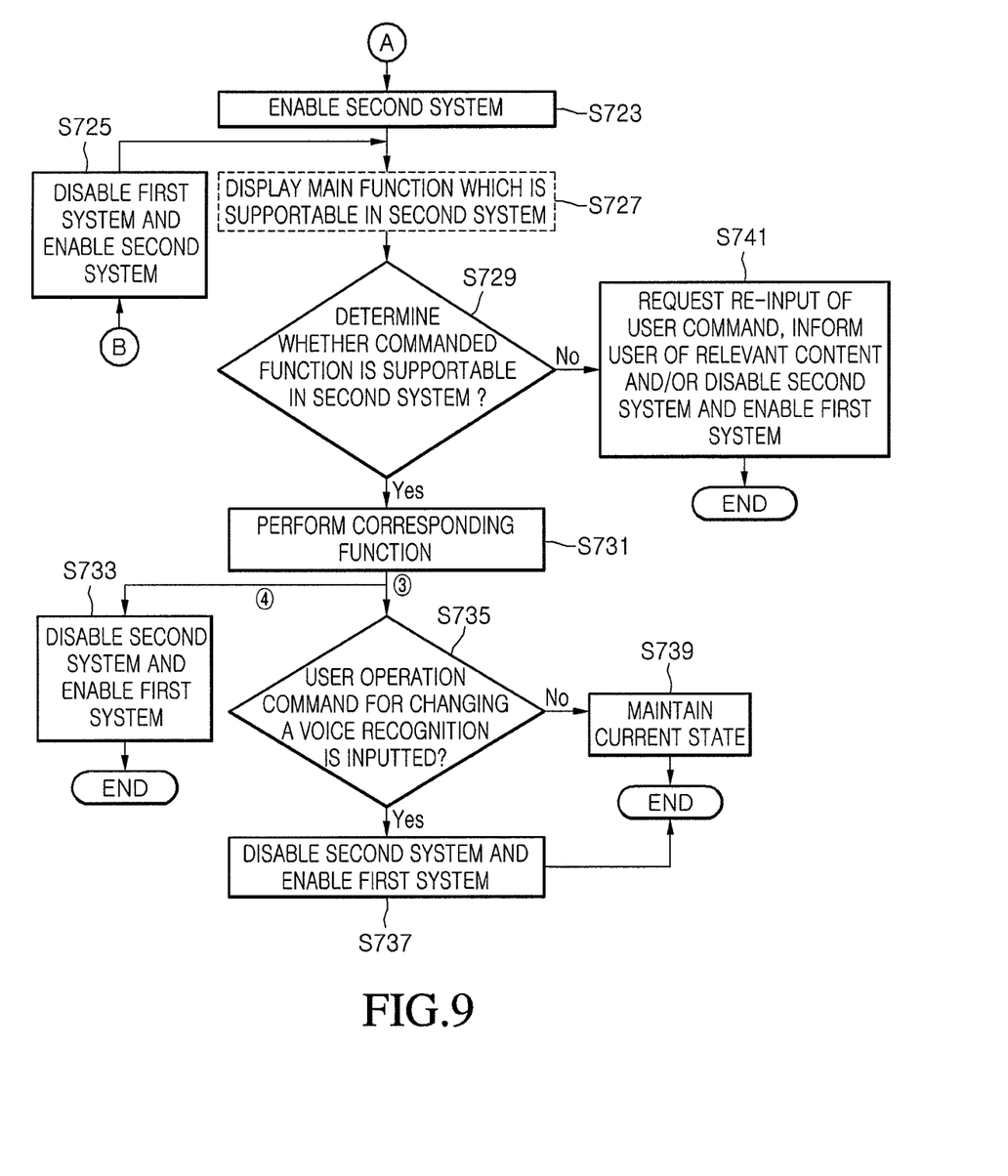

In the above-described operation, the reciprocal operation control between the two voice recognition systems has been described as an example. However, reciprocal operation control between three or more voice recognition systems may also be performed. FIGS. 8 and 9 are flowcharts illustrating the reciprocal operation control of a multi-voice recognition system according to another embodiment.

The operations of FIGS. 8 and 9 are the substantially same as the operation control of FIGS. 6 and 7. In the difference between FIGS. 8 and 9 and FIGS. 6 and 7, when an operation function desired by a user is not supported by a corresponding system, another system is directly enabled and operates according to the control of the controllers of a product and a voice recognition system even without the operation control change request of a user in operations S719 and S725.

In a product including a plurality of voice recognition systems (i.e., at least two voice recognition systems), when a command that transfers operation control authority to a second system is inputted in a state where a first system is set in an enabled state, an input command function is performed by disabling the first system and enabling the second system. The second system may be disabled and the first system may be changed to an enabled state, according to a user control command (which indicates returning to a previous system) or upon completion of a preset control procedure (i.e., the operation completion of the second system).

When a user commands a specific function through a microphone, a voice recognition system may request the re-input of the command, and may inform the user of relevant content or may transfer operation control authority to another system when the specific function is not supported by the first system that currently is in an enabled state.

In a product including a plurality of voice recognition systems (i.e., at least voice recognition two systems) according to another embodiment, when a user commands a specific function via a voice command, a commanded function may be performed by disabling the first system and enabling the second system when the specific function is not supported by the first system. Moreover, the second system may be disabled, and the first system or a third system may be changed to an enabled state, according to a user control command or upon completion of a preset control procedure.

In operations according to embodiments, first and second systems may operate in master (i.e., enabled) and slave (i.e., disabled) relationships, but they are not limited thereto. Each of the first and second systems may independently operate as a master. Alternatively, by switching their functions, each of the first and second systems may operate as a master or a slave.

In some embodiments, the reciprocal voice recognition between the first and second systems may be controlled in an enabled/disabled state.

Accordingly, all operation functions that are provided from the respective systems of a vehicle may be connected to one another and thereby performed.

In the previous discussion, the plural multi-voice recognition systems/devices have been identified as being installed or co-resident in a single environment, such as an automobile. The plural operation control devices may also be installed or co-resident in a truck, boat, airplane, etc. The plural operation control devices may also be installed or co-resident in a house, apartment or other residential or business unit.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An operation control apparatus in a multi-voice recognition system, the operation control apparatus comprising:
   a plurality of operatively connected voice recognition systems, each including
   a voice recognition module configured to recognize voice,
   a first user input unit configured to set a voice recognition function, or set a short key for realizing a specific preset function, and
   a second user input unit configured to input a user operation command to the voice recognition system,
   wherein, when a first of the plurality of voice recognition systems is in an enabled state, the first system is configured to be disabled and a second of the plurality of voice recognition systems is configured to be enabled based on a user command.

2. The operation control apparatus according to claim 1, wherein each first user input unit comprises:
   at least one button or touch unit configured to set an operation state of the corresponding voice recognition system.

3. The operation control apparatus according to claim 1, wherein each second user input unit comprises:
   a microphone configured to input a user operation command to the corresponding voice recognition system.

4. The operation control apparatus according to claim 1, wherein each voice recognition system comprises:
   a voice recognition module configured to recognize a user operation command that is inputted through the corresponding second user input unit;
   a controller configured to control an overall system operation,
   wherein the controller is further configured to control a change to a disabled state, or maintain an enabled system, based on
      information that is inputted through the corresponding first user input unit, and
      a user command inputted through the corresponding second user input unit and that enables another of the plurality of voice recognition systems when an operation of a currently-enabled system is completed and when a function requested by a user is to be realized in the another of the plurality of voice recognition systems on the basis of the information that is inputted through the first user input unit;
   a memory configured to store a function, including a main function or a main function and a plurality of corresponding sub-functions that are supportable in each of the voice recognition systems;
   a display configured to output the function that is stored in the memory; and an interface configured to reciprocally enable/disable operation state settings between the corresponding voice recognition system and the another of the plurality of voice recognition systems.

5. The operation control apparatus according to claim 1, wherein a plurality of operation functions that are stored in a first of the plurality of voice recognition systems and a plurality of operation functions that are stored in a second of the plurality of voice recognition systems are classified and stored based on
   (1) whether operations of the corresponding voice recognition system are realized by a short key,
   (2) whether a user command is directly realized in the corresponding voice recognition system,
   (3) whether the user operation command is realized over another network, or
   (4) at least one of a plurality of preset operational factors.

6. The operation control apparatus according to claim 5, wherein the preset operational factors comprise at least one of:
   a frequency of an operation function, a time when the operation function is registered, and a time when the operation function is used.

7. The operation control apparatus according to claim 1, wherein each of the voice recognition systems further comprises:
   a memory configured to store a corresponding function including a short key corresponding to a an operation medium, wherein the operation medium comprises one of a telephone and a personal media player (PMP).

8. The operation control apparatus according to claim 1, wherein the first user input unit of one of the plurality of voice recognition systems is configured to be set as a short key for directly realizing a specific function.

9. The operation control apparatus according to claim 8, wherein the short key is configured to enable the corresponding voice recognition system.

10. A reciprocal operation method for a plurality of voice recognition systems, each including a voice recognition module for recognizing voice, each storing at least one of a plurality of functions to be performed, the reciprocal operation method comprising:
    enabling a first voice recognition system according to an input of preset information;
    receiving a function operation command through an input unit;
    determining if an operation corresponding to the function operation command is supportable by the enabled first voice recognition system;
    one of realizing the operation, outputting a command re-input request, and outputting a message that indicates that the operation is not supported by the enabled first voice recognition system; and
    disabling the first voice recognition system, and enabling a second voice recognition system, in accordance with a command to transfer voice recognition operation control from the first voice recognition system, when the operation corresponding to the function operation command is completed.

11. The reciprocal operation method according to claim 10, further comprising:
    receiving a message commanding a transfer of operation control from the first voice recognition system to a second voice recognition system, in response to one of the re-input request or the message that indicates that the commanded function is not supported by the enabled first voice recognition system.

12. The reciprocal operation method according to claim 10, further comprising:
    displaying a plurality of functions which are supportable in the enabled first voice recognition system.

13. The reciprocal operation method according to claim 10, wherein:
    the first voice recognition system stores a preset main function irrespective of a system user, and
    a second voice recognition system stores a sub function, corresponding to the preset main function, that is set by the system user, the sub function including a hot key or another subordinate function.

14. The reciprocal operation method according to claim 10, wherein:
    the first voice recognition system stores a function that is directly realizable in the plurality of voice recognition systems, and
    a second voice recognition system stores a function that is realizable via an external network.

15. A reciprocal operation method for a plurality of voice recognition systems, each including a voice recognition module for recognizing voice, each storing at least one of a plurality of functions to be performed, the reciprocal operation method comprising:
    enabling a first voice recognition system, and performing a function of the first voice recognition system, according to input of preset information;
    receiving a command that corresponds to a function of a second voice recognition system;
    disabling the first voice recognition system, enabling the second voice recognition system, and performing the function of the second voice recognition system;
    determining if a new operation is supportable in the second voice recognition system, when a corresponding function operation command is inputted through an input unit; and
    one of realizing the new operation, outputting a command re-input request, and outputting a message that indicates that the new operation is not supported by the enabled second voice recognition system.

16. A reciprocal operation method in a plurality of voice recognition systems, each including a voice recognition module for recognizing voice, each storing at least one of a plurality of functions to be performed, the reciprocal operation method comprising:
    enabling a first voice recognition system, according to an input of preset information;
    receiving a function operation command through an input unit;
    determining whether an operation corresponding to the function operation command is supportable by the first voice recognition system; and
    disabling the first voice recognition system, and enabling a second voice recognition system if the operation corresponding to the function operation command is not supportable by the first voice recognition system.

17. The reciprocal operation method according to claim 16, further comprising:
    when the second system is enabled, inputting a second unction operation command, and determining if a new operation corresponding to the second function operation command is supportable; and
    one of realizing the new operation, outputting a command re-input request, and outputting a message that indicates that the new operation is not supported by the enabled second voice recognition system.

18. A reciprocal operation method in a plurality of voice recognition systems, each including a voice recognition module for recognizing voice, each storing one of a plurality of functions to be performed, the reciprocal operation method comprising:

enabling a first of the plurality of voice recognition systems, and performing an operation via a short key; and     disabling the enabled first voice recognition system, and enabling one of a second or third of the plurality of voice recognition systems in response to a command to transfer voice recognition operation control from the first voice recognition system after the operation is realized.

19. A motor vehicle, comprising:

a plurality of operatively connected voice recognition systems, each including     a voice recognition module configured to recognize voice,     a first user input unit configured to set a voice recognition function, or set a short key for realizing a specific preset function, and     a second user input unit configured to input a user operation command to the voice recognition system,     wherein a first voice recognition system is configured to be enabled according to an input of preset information, to receive a function operation command through a corresponding input unit, determine if an operation corresponding to the function operation command is supportable by the enabled first voice recognition system, and one of realize the operation, output a command re-input request, and output a message that indicates that the operation is not supported by the enabled first voice recognition system, and     wherein the first voice recognition system is configured to be disabled, and a second voice recognition system is configured to be enabled, in accordance with a command to transfer voice recognition operation control from the first voice recognition system, when the operation corresponding to the function operation command is completed.

* * * * *